April 26, 1955
L. BOOR
2,706,909
TEAR TESTING APPARATUS AND METHOD
Filed Sept. 15, 1950
4 Sheets-Sheet 1
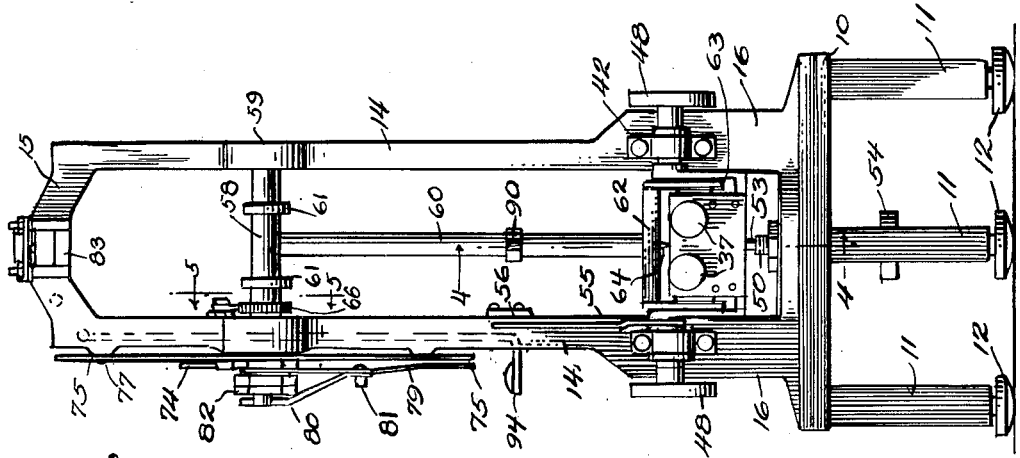
INVENTOR
Ladislav Boor
BY
W. J. Eccleston
ATTORNEY April 26, 1955 L. BOOR 2,706,909
TEAR TESTING APPARATUS AND METHOD
Filed Sept. 15, 1950 4 Sheets-Sheet 2

INVENTOR
Ladislav Boor

BY
ATTORNEY

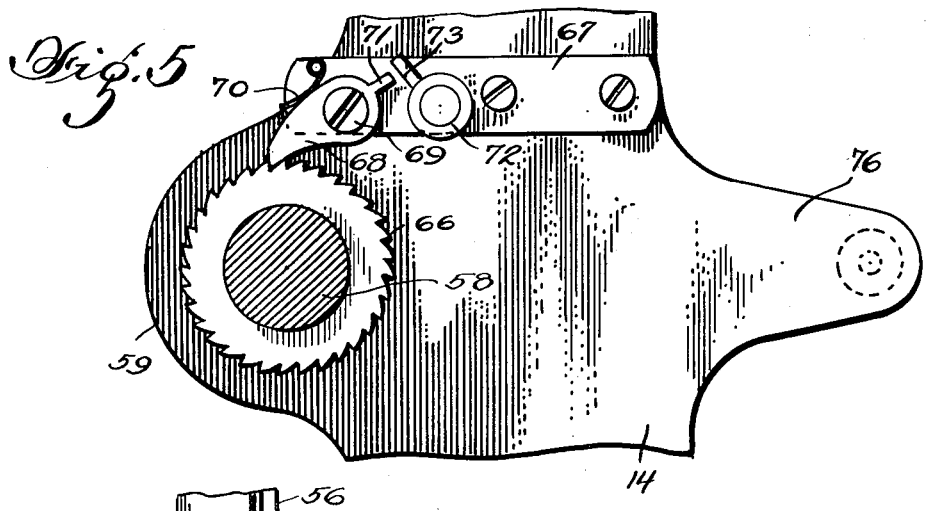
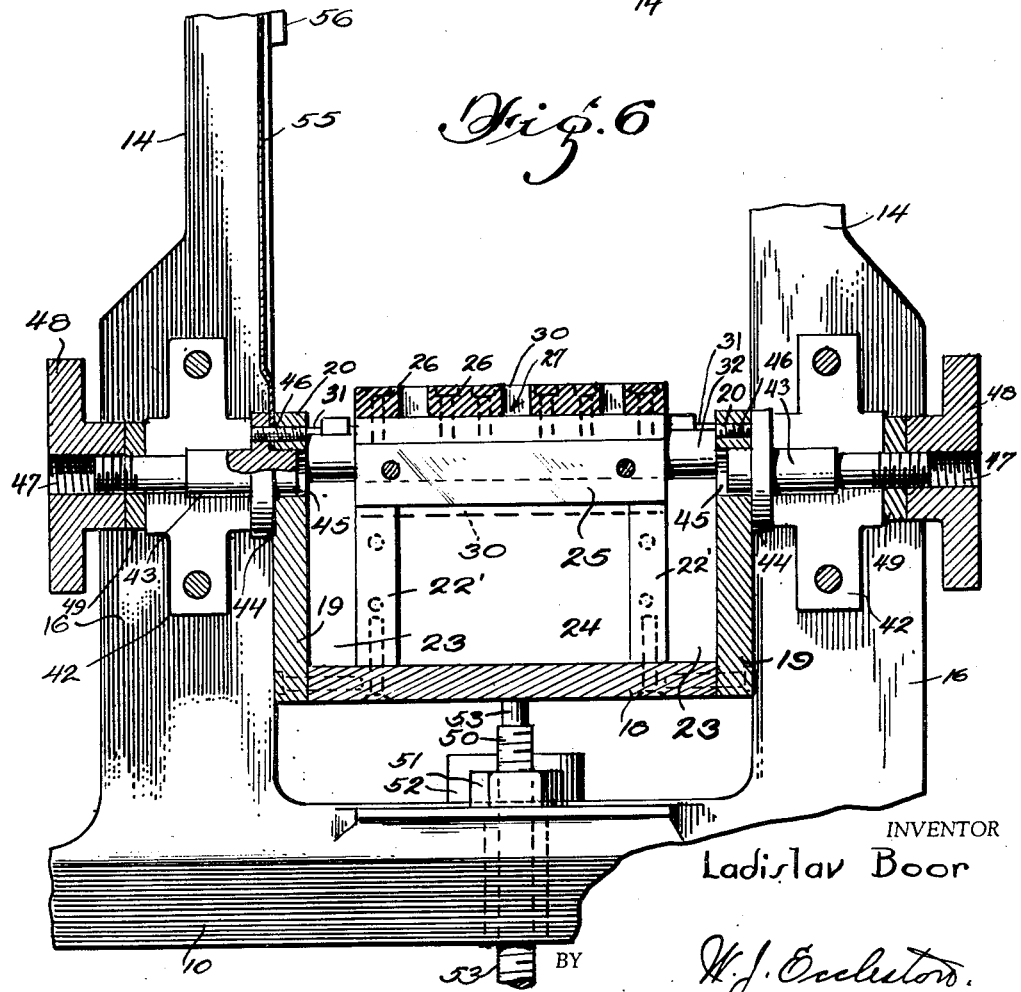

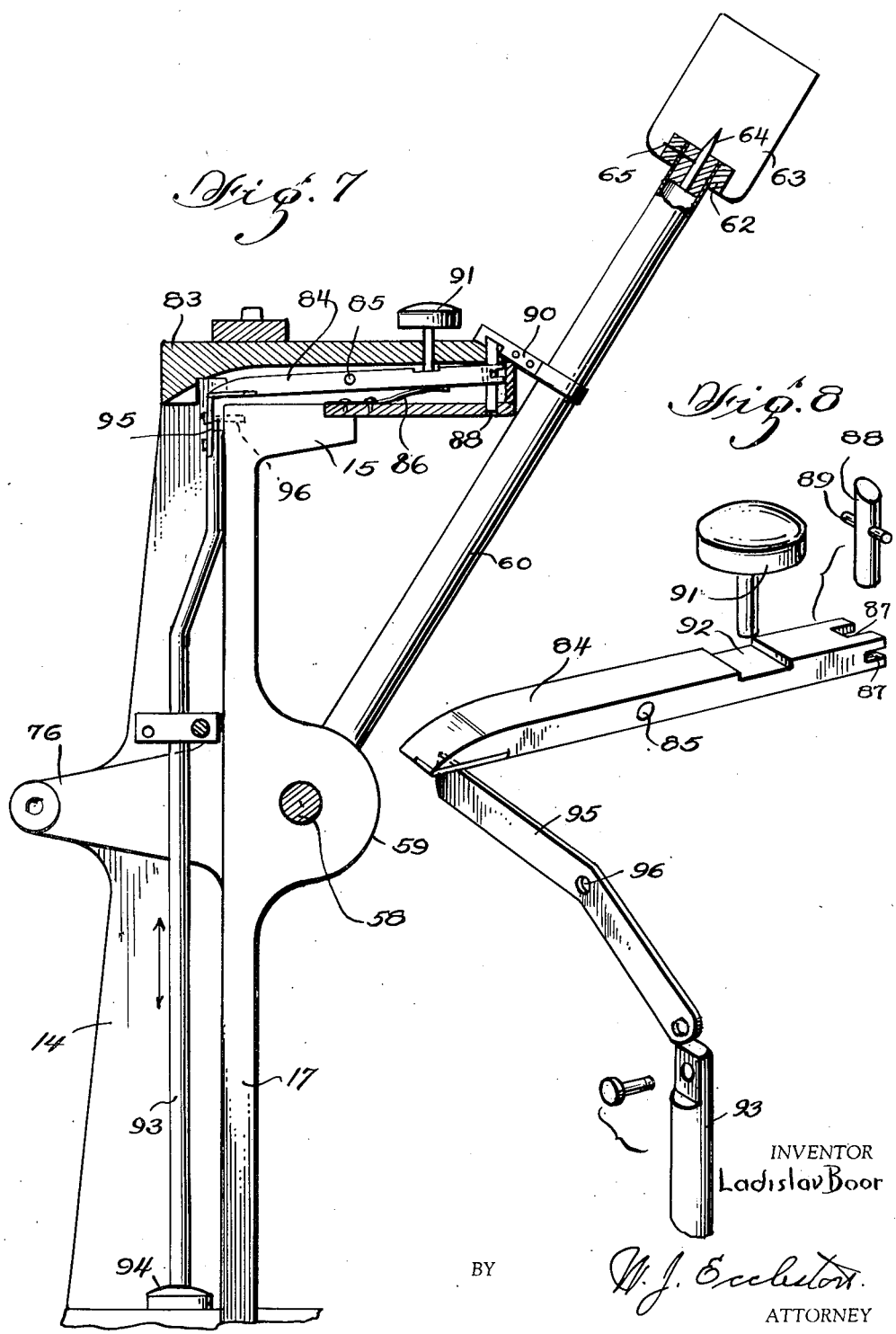

United States Patent Office 2,706,909
Patented Apr. 26, 1955

2,706,909

TEAR TESTING APPARATUS AND METHOD

Ladislav Boor, Bethesda, Md.

Application September 15, 1950, Serial No. 185,135

17 Claims. (Cl. 73—159)

(Granted under Title 35, U. S. Code (1952), sec. 266)

The invention described herein, if patented, may be manufactured and used by or for the Government for governmental purposes, without the payment to me of any royalty thereon.

The present invention relates to testing apparatus for and to a method of testing fabrics, film material and the like, although not necessarily restricted to this use.

An important object of the invention is the provision of an apparatus and method for quantitatively measuring the tendency or ability of fabric, film material or the like to resist penetration, tearing or snagging.

Another object of the present invention is the provision of a testing apparatus of simple construction and operation which may be readily adjusted to accomplish the various tests and which will accurately indicate the results of such tests.

Other objects and advantages of the invention will be apparent during the course of the following description.

Figure 3:
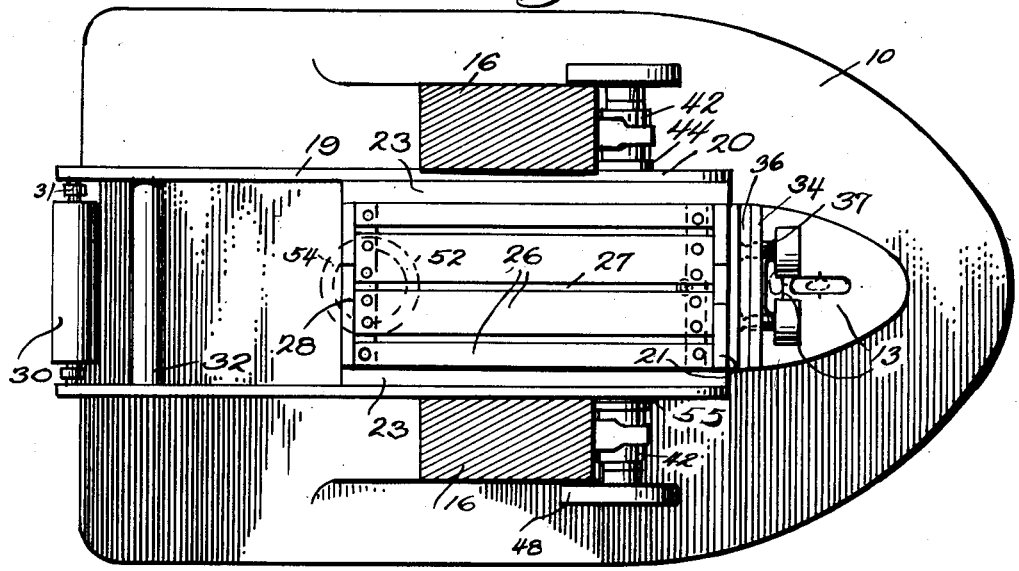
Figure 4:
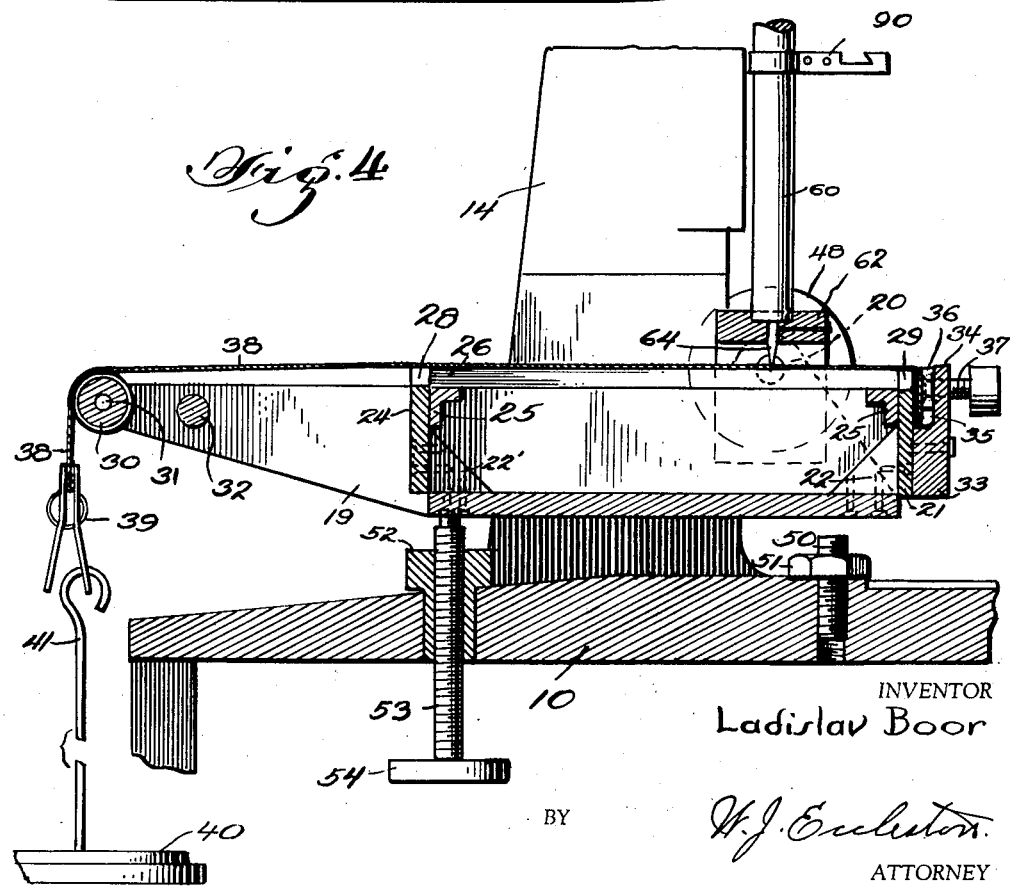

In the accompanying drawings, which form a part of this specification wherein like numerals designate like parts throughout, Figure 1 is a side elevation of an apparatus embodying the invention, a portion of the pendulum being broken away, Figure 2 is a front elevation thereof, showing the pendulum in its lowermost position, Figure 3 is a horizontal sectional view taken on the line 3—3 of Figure 1, looking in the direction of the arrows, Figure 4 is a fragmentary vertical sectional view taken on the line 4—4 of Figure 2, parts being shown in elevation, Figure 5 is a fragmentary sectional view taken on the line 5—5 of Figure 2, Figure 6 is a fragmentary vertical sectional view taken on the line 6—6 of Figure 1, looking in the direction of the arrows, parts being shown in elevation, Figure 7 is a fragmentary side elevational view of the upper portion of the apparatus showing the raised position of the pendulum and illustrating the pendulum latching and releasing mechanism, parts being shown in section, and, Figure 8 is a fragmentary exploded perspective view of the pendulum latching and releasing mechanism.

In the drawings, wherein for the purpose of illustration is shown a preferred embodiment of the invention, the numeral 10 designates the base of the apparatus supported by three legs 11 with adjustable foot portions 12. A pair of spirit levels 13 (Figure 3) are disposed in the front upper surface of the base. One of the levels 13 is arranged longitudinally of the base and the other transversely thereof so that the base may be readily brought to a level position by adjusting the foot portions 12 of base legs 11. The base 10 supports a frame comprising spaced arms 14, disposed adjacent the sides of the base and intermediate of the front and rear ends thereof, and a slightly arched cross member 15 connecting the tops of the arms and forming the top of the frame. The lower portions of frame arms 14 are thickened, as at 16, and the arms are preferably widest at their lower ends, tapering to their upper ends. The forward edges of the arms are preferably provided with an external reinforcing flange 17, as seen in Figure 7. The frame and base are preferably integrally formed, as by casting in one piece.

An important feature of the present invention is the specimen supporting table and the supporting platform therefor. The supporting platform is U-shaped in cross-section, as seen in Figure 6, and comprises a substantially horizontal base plate 18 spaced above the top of base 10 and extending from a point spaced a substantial distance in front of frame arms 14 to a point spaced behind the rear portions of the frame arms. Platform side plates 19 are arranged at each side of the base plate 18 and secured at their lower edges to the sides of the base plate by bolts or the like. The front edges of the side plates are inclined and merge into upstanding ears 20 which protrude above the top edges of the side plates at points adjacent the front of the platform. The side plates 19 extend a substantial distance beyond the rear edge of the base plate 18 to a point spaced behind the rear edge of base 10, as illustrated in Figures 1, 3 and 4, the upper edges of the side plates being straight and normally substantially horizontal from the ears 20 to the rear end of the plate, while the lower edges of the side plates are inclined upwardly from the rear end of base plate 18 to form a tapered rear platform portion open at the bottom.

A front platform supporting plate 21 is secured to the front portion of bottom plate 18 by means of a pair of triangular braces 22 bolted or otherwise secured to the upper face of the base plate and the rear face of the front plate. The front plate is substantially narrower than the base plate 18 and is centered to leave spaces 23 between the sides of the front plate and the inner walls of the side plates 19. A rear platform supporting plate 24 is similar to front plate 21 and is secured to the bottom plate 18 by similar triangular braces 22'. Front and rear plates 21 and 24 extend a short distance above side plates 19. Table or platform supporting angle brackets 25 are bolted or otherwise secured to the inner faces of the front and rear platform supporting plates 21 and 24 in spaced parallel relation to the top edges of said plates. Platform bars or slats 26 are bolted to the horizontal flanges of the angle brackets 25 with their upper edges disposed above or flush with the top edges of the front and rear plates. The bars 26 are spaced apart longitudinally and are shown as four in number with the widest bars arranged between the narrower bars. The two center bars are arranged to provide a longitudinal gap or space 27 which is preferably from one-eighth to one-quarter of an inch wide. If desired, the width of the gap 27 may be varied by providing additional bolt holes in the angle brackets 25. The rear plate 24 is provided with a notch 28 in its upper surface registering with the gap 26, and a similar notch 29 may be provided in the front plate 21, if desired.

A roller 30 is mounted on a transverse roller shaft 31 mounted in the rear of the supporting platform and connecting the rear portions of side plates 19. The roller is mounted for free rotation and has its upper surface arranged in the plane of the top surfaces of the platform bars 26. The rear surface of the roller extends a slight distance beyond the rearmost portions of the side plates 19. A suitable brace rod 32 connects the side plates 19 at a point spaced forwardly of the roller 30 and below the top surfaces of the side plates.

A vise bracket 33 is bolted to the forward face of front plate 21 and has an upstanding flange 34 extending in spaced parallel relation to the front plate 21 to provide a recess 35 between the front plate and the upright flange 34. A clamping or vise jaw 36 is arranged within the recess 35 and is secured to the forward ends of headed vise screws 37 which engage internally threaded bores in flange 34 but which have a freely rotatable engagement with the vise jaw 36. The vise jaw 36 is adapted to engage the forward edge, preferably doubled, of a piece of specimen fabric 38 to be tested and hold it firmly in position. The fabric strip is extended over the table formed by bars 26 and over roller 30 where it is engaged by a suitable clamp such as the well-known spring clamp 39 illustrated in Figures 1 and 4. A weight or weights 40 may be suspended from the clamp 39 by means of a suitable hook 41 engaging one of the handles of the clamp. It will be seen that the cloth specimen 38 is held at one end by the vise and is tensioned at its other end by the weight 40 so that it will be drawn taut across the top of the table formed by bars 26. The tension on fabric 38 may be varied by varying the weight attached to clamp 39.

The table support platform is pivotally connected adjacent its forward end to the forward edges of the enlarged lower portions 16 of frame arms 14 on an axis substantially coinciding with the top surface of the table. Split support brackets 42 are bolted to the forward edges of arm portions 16 and serve as bearings for lock wheel screws 43 having radial disc flanges 44 spaced from their inner ends and disposed between the brackets 42 and the ears 20 of side plates 19. The smooth inner ends of lock screws 43 form stub shafts which extend into bores 45 in ears 20. Suitable set screws or bolts 46 connect ears 20 to radial screw flange 44 to key these parts together. The outer portions of lock screws 43 are reduced in diameter and are screw-threaded, extending beyond the outer ends of the brackets 42 where they are received in threaded bores 47 of lock wheels 48. Suitable washers 49 are arranged on the outer ends of screw shafts 43 between the outer ends of brackets 42 and the inner ends of lock wheels 48. When lock wheels 48 are loosened, the lock screws 43 and flanges 44 are free to rotate to permit adjustment of the angle of the table support. When the lock wheels are tightened, the disc flanges 44 are drawn tightly against the inner ends of brackets 42 to prevent rotation of lock screws 43 and to thereby lock the table support in adjusted position, due to the keying action of set screws 46.

A limit screw 50 is received in a screw threaded opening in the frame base 10 and is held in adjusted position by means of nut 51. The limit screw 50 is in line with the longitudinal center of the table support and is spaced forwardly of the table supporting lock screws 43 and rearwardly of the forward end of the table support. The limit screw is adjusted in spaced relation below the forward end of the table support and serves as a stop to limit the forward tilting of the table support about its pivot in bearings 42.

An adjusting bushing 52 is carried by the base 10 at a point below the rear portion of bottom plate 18 and screw-threadedly receives a vertical adjusting screw 53 having a head 54 arranged below the bottom of base 10. The upper end of the adjusting screw 53 engages the underside of the bottom plate 18 at a point adjacent its rear end. When it is desired to vary the angular position of the table support, the lock wheels 48 are loosened and adjusting screw 53 turned to raise or lower the rear portion of the table support to the desired position, the table support rotating about the axis of lock screws 43, and the lock wheels are then tightened to maintain the adjusted position.

In order to indicate the angular position of the table support a pointer 55 is clamped between the left side of the table support and the adjacent disc flange 44 by means of the set screws 46 which preferably pass through the base of the pointer to insure movement of the pointer with every movement of the table support. A scale plate 56 extends forwardly and horizontally from the inner side of left hand frame arm 14 to which it is rigidly secured, and has an arcuate inclination scale 57 thereon over which the upper tip of the pointer is designed to move. The scale starts at zero and is calibrated from left to right in fractions of degrees. With the table in a horizontal position the pointer will be vertical with its tip resting on zero. If the rear end of the table is raised by actuation of the adjusting wheel 54 and lock wheels 48, the pointer will move to the right on the scale and indicate the angle assumed by the table.

A pendulum shaft 58 is journaled for rotation in suitable antifriction bearings arranged in ears 59 protruding from the forward edge of frame arms 14 at a point spaced below the top of the arms. The axis of the pendulum shaft is in the same vertical plane as the axis of the lock screws 43 which serve as the axis of rotation of the table. A pendulum 60 is rigidly secured at 61 to the shaft 59 to rotate therewith and is provided with a head comprising a transverse cross-piece 62 secured to the pendulum, and a pair of spaced depending arms 63. The length of the pendulum 60 is such that in its lowermost position, the lower surface of cross-piece 62 is spaced above the upper surface of the specimen supporting table, and the depending arms 63 span the width of the table, being disposed in the spaces 23 between the side edges of the table and the inner sides of the frame arms 14. A needle 64 is disposed axially of the pendulum 60 and is axially adjustable, being held in position by any suitable securing member such as a set screw 65. The needle extends between the arms 63 in a position to engage a specimen on the table, the position of the needle being such as to place it above the longitudinal center of the slot 27 between the table bars 26.

A fine-tooth ratchet wheel 66 is keyed to shaft 58 to rotate therewith and is arranged adjacent but spaced from the inner side of the left hand frame arm 14. A horizontal pawl holding bar 67 is bolted or otherwise secured to the inner side of the frame arm above the ratchet wheel 66 and a ratchet pawl 68 is pivotally supported on the bar 67 by means of bolt 69 and in position to engage the teeth on the upper side of the ratchet wheel. As the pawl is disposed above the ratchet wheel, the weight of the pawl will keep it in engagement with the ratchet teeth, but if desired a small leaf spring 70 may be employed to urge the pawl toward the ratchet wheel. If such a spring is used it should not have sufficient strength to noticeably impede the rotation of the ratchet wheel and pendulum shaft.

A pin or other protuberance 71 is carried by the pawl on the side of the pawl pivot opposite the teeth engaging portion of the pawl. A pawl release member 72 is rotatably mounted on the pawl holding bar 67 adjacent the pawl and has a radial lug 73 which normally extends in spaced relation above the pawl pin 71 to permit free movement of the pawl. A latch lever 74 is pivotally arranged on the outside of left hand arm 14 and is connected to pawl release member 72 by a suitable shaft so that pivoting of the latch lever will rotate the release member 72. As viewed in Figure 5, rotation of the release member 72 to the left, or anti-clockwise, will bring the radial lug 73 into engagement with pawl pin 71 to rotate the pawl out of engagement with the teeth of ratchet wheel 66.

A semi-circular dial plate 75 having an inverted scale thereon is attached to the outer face of left frame arm 14 and to a horizontal rearwardly extending bracket 76 formed as part of said arm, by means of suitable screws 77. The straight edge of dial plate 75 is disposed in a vertical plane and is provided at its center with an enlargement or ear 78 which overlies the ear 59, forming the bearing for pendulum shaft 58. The shaft 58 extends completely through and beyond the dial ear 78 and a maximum hand or pointer 79 is frictionally rotatable on the shaft extension, exteriorly of the dial plate 75. The pointer 79 will normally assume a vertical downward position at which the pointer tip will coincide with the maximum reading at the bottom of the dial. A live hand 80 is rigidly secured to the outer end of pendulum shaft 58 and is of shorter length than the maximum hand, having its outer end curved inwardly to a position in proximity to the maximum hand. A stud 81 projects from the maximum hand into the path of live hand 80, so that as the live hand moves from right to left with the pendulum, as viewed in Figure 1, the live hand will engage stud 81 and carry the maximum hand with it. When the pendulum is released by latch lever 74 and pawl 68, the maximum hand will be held in position by friction to indicate the maximum upward swing of the pendulum. Any suitable means to frictionally tension maximum hand 79 may be employed, as for example, suitable nuts 82 which screw-threadedly engage the projecting end of pendulum shaft 58.

The top cross arm 15 of the frame is recessed at its center to receive a forwardly projecting housing shelf 83 which is bolted in place. The forward end of the shelf or housing is beveled and the interior of the housing contains a transfer arm 84 which is substantially horizontally disposed and pivoted adjacent its mid-portion at 85. A leaf spring 86 engages the lower portion of the arm 84 forwardly of the pivot and normally urges the forward portion of the arm upwardly. The forward end of the arm 84 is provided with vertical and horizontal open notches 81. A pendulum latch pin 88 is received in the vertical notches 87 and provided with laterally projecting lugs or cross-pins 89 which are received in horizontal notches 87. The upper end of the latch pin is beveled and extends upwardly through an opening in the beveled face of the housing 84, projecting a short distance thereabove to engage a notch in a bracket 90 clamped to the pendulum between the ends of the pendulum, as illustrated in Figure 7 where the pendulum is shown in its raised and latched position. A plunger 91 with an enlarged head extends through an opening in the top of the housing 84 and rests in a groove 92 in the upper end of transfer arm 84, forwardly of pivot 85. When the plunger 91 is pushed downwardly, the arm 84 moves against spring 86 to withdraw latch pin 88 from the bracket notch and release the pendulum. The notches 87 and groove 92 are sufficiently large to prevent any binding of the parts due to the arcuate movement of the forward end of arm 84 and the straight line movement of pin 88 and plunger 91. The leaf spring 86 will return the latch pin 88 to its raised position. When the pendulum is again raised, bracket 90 will ride over latch pin 88, depressing it, and the pin will be raised again by spring 86 to engage the bracket notch.

In addition to the latch pin releasing plunger 91, a vertically arranged lever 93 is mounted for vertically sliding movement on the outer face of frame arm 14 behind the dial plate 75. The lower end of lever 93 projects below the dial plate and is provided with a horizontally projecting thumb piece 94 at its lower end. The upper end of lever 93 is pivotally secured to one arm of a bell-crank 95 which is pivoted at 96 to the frame member 15 with its other arm disposed immediately below the rearward end of transfer arm 84. Downward movement of lever 93 by pressure on thumb piece 94 will also retract the latch pin 88 to release the pendulum, by means of an elevating motion imparted to the rear of transfer arm 84 by the bell-crank 95.

In operation, the base 10 is leveled by adjustment of feet 12 and reference to the levels 13 and the pendulum is lowered to its lowermost position shown in Figures 2 and 4. The needle 64 is adjusted so that its tip is spaced above the top of the table a distance equal to the thickness of the specimen to be tested, the table being in its horizontal position registering zero on dial 57. The pendulum is then raised to its upper position where it is held by latch pin 88. The specimen 38 to be tested is preferably doubled over at one end and secured by vise screws 37 at the right or forward end of the table. The specimen is then drawn taut over the table top and passed over the roller 30 at the rear of the table where it is gripped by clamp 39 with weight 40 attached thereto. The clamp 39 is of a width such as to firmly grip the full width of the specimen so that the specimen is drawn taut and smooth across the top of the table bars 26. The width of the specimen is somewhat less than the width of the table. Where a three inch specimen is tested, the table will be at least three and one half inches in width so that after each testing stroke of the pendulum, the specimen may be moved laterally, by loosening vise screws 37, to present a different surface to the pendulum needle.

With the table set in its zero or horizontal position, and the pendulum needle set above the table top a distance equal to the thickness of the specimen, the surface of the specimen is disposed in a plane tangent to the arc described by the tip of the pendulum needle 64 when the pendulum is released. If the specimen does not tear on the swing of the pendulum, the table is inclined to the first gradation of the scale 57, which may be divided into tenths of a degree, for example, by manipulation of lock wheels 48 and adjusting screw 53, and the pendulum swung again. After each swing of the pendulum, the table is adjusted to a slightly greater angle until the pendulum needle penetrates the specimen. At this time, the scale 57 and pointer 55 will indicate the angle at which the specimen was torn by the needle. The scale 57 indicates the resistance of the specimen to initial tearing, which will vary with the surface finish of the specimen. The amount of energy required to tear the specimen, that is to say, the amount of energy absorbed by the tearing operation, will be indicated on scale 75 by maximum pointer hand 79. When the pendulum is released from its poised position by operation of plunger 91 or thumb piece 94, with the pointer 79 in its lowermost position, the live hand 80 moves with the pendulum and engages stud 81 to carry pointer 79 to the highest position reached by the pendulum. At this point, pawl 68 engages one of the fine teeth of ratchet wheel 66 and retains the pendulum in such position until latch lever 74 is operated to release the pendulum. The pawl 68 prevents a return swing of the pendulum while the specimen is in position to be torn by the return swing of the pendulum. The pendulum will normally be reset while the table angle is being adjusted. After resetting the pendulum and taking the scale reading, the maximum hand 79, which is held in place by friction imparted by nuts 82, is reset to its lowermost position by hand, ready for the next swing of the pendulum.

The two scales 75 and 57 indicate different characteristics of the specimen. Specimens with a smooth or shiny surface, such as coated fabrics, films or the like will tend to resist initial penetration and require a greater table angle before penetration is accomplished, but may tear very readily once penetration has occurred. On the other hand, rough finish materials will be snagged easily by the needle but may require a great deal of energy for tearing, such energy absorption being indicated on scale 75.

One very effective method of testing with the present apparatus is to test a number of specimens of the same material, for example ten, at each table angle, recording the number of specimens torn at each angle, and varying the table angle until all ten specimens tear. A chart can be used on which each material may be charted graphically by a curve showing the number of specimens torn at each table angle. By the use of such charts, the resistance to initial tearing or snagging of different materials may be readily compared. A separate recording of the energy absorption indicated on scale 75 can also be kept. The scale 75 is graduated from zero near its top to a maximum reading at its lower end, the zero indicating the maximum swing of the pendulum when its swing is unobstructed.

Instead of using separate specimens for each pendulum stroke, the specimens may be shifted laterally so that one specimen may be used for a number of pendulum strokes. The gap 27 between table bars 26 permits free movement of the pendulum needle while the spaces 23 between the table and frame arms permit unobstructed passage of the pendulum arms 63. The limit screw 50 prevents tilting of the table to the point where the pendulum cross-piece 62 or the needle 64 will strike the top of the table. A maximum safe angle of inclination of the table will be about thirteen and one-half degrees from the horizontal.

While the preferred embodiment of the invention has been shown for purpose of illustration, it is to be understood that various changes in the size, shape and arrangement of parts may be resorted to without departing from the spirit of the invention or the scope of the subjoined claims.

I claim:

1. The method of testing the resistance of materials to snagging and tearing by a weighted needle swinging freely in an arc, which comprises the steps of presenting a plurality of strips of the material one at a time to the needle in a plane tangent to the arc of the needle swing, swinging the needle over the surface of the material, inclining the plane of the strips of material by a series of equal increments to vary the angle of attack of the needle, swinging the needle over the surface of each strip of material at each inclination, recording each angle of inclination and the number of strips of material torn at each inclination, and continuing the steps of varying the angle of inclination and swinging the needle until all of the strips of material are torn.

2. The method of testing the resistance of materials to snagging and tearing by a weighted needle swinging freely in an arc, which comprises the steps of presenting a plurality of strips of the material one at a time to the needle in a plane tangent to the arc of the needle swing, swinging the needle over the surface of the material, inclining the plane of the strips of material by a series of equal increments to vary the angle of attack of the needle, swinging the needle over the surface of each strip of material at each inclination, recording each angle of inclination and the number of strips of material torn at each inclination, continuing the steps of varying the angle of inclination and swinging the needle until all of the strips of material are torn, and recording the energy absorbed from the needle swing when each strip of material tears.

3. In a material testing apparatus, a supporting frame, a pendulum pivotally supported by said frame and having a head, a needle carried by the head of the pendulum, a material support carried by said frame below the pendulum pivot and in a plane tangent to the arc of the pendulum needle, and means carried by said frame to incline said support about an axis disposed parallel to and in a vertical plane with the axis of the pendulum pivot, said axis of inclination being substantially coincident with a portion of the material engaging surface of the support.

4. In a material testing apparatus, a supporting frame, a pendulum pivotally supported by said frame and having a head, a needle carried by the head of the pendulum, a material support carried by said frame below the pendulum pivot and in a plane tangent to the arc of the pendulum needle, means carried by said frame to incline said support about an axis disposed parallel to and in a vertical plane with the axis of the pendulum pivot, said axis of inclination being substantially coincident with a portion of the material engaging surface of the support, and means to indicate the extent of the inclination of the support.

5. In a material testing apparatus, a supporting frame, a pendulum pivotally supported by said frame and having a head, a needle carried by the head of the pendulum, a material support carried by said frame below the pendulum pivot and in a plane tangent to the arc of the pendulum needle, means carried by said frame to incline said support about an axis disposed parallel to and in a vertical plane with the axis of the pendulum pivot, said axis of inclination being substantially coincident with a portion of the material engaging surface of the support, and means to limit the inclination of the support.

6. In a material testing apparatus, a supporting frame, a pendulum supported by said frame and having a head, a needle carried by the head of the pendulum, a material support carried by said frame below the pendulum pivot and in a plane tangent to the arc of the pendulum needle, means to incline said support about an axis disposed parallel to and in a vertical plane with the axis of the pendulum pivot, said axis of inclination being substantially coincident with a portion of the material engaging surface of the support, means to limit the inclination of the support, and means to visually indicate the extent of the support inclination.

7. In a testing apparatus, a supporting frame having spaced arms, a pendulum pivotally supported between the frame arms and having a head, a needle carried by said head and extending axially of the pendulum, a material support pivotally arranged between the frame arms on an axis spaced below the axis of the pendulum pivot and in a vertical plane therewith, said support being normally disposed in a plane tangent to the arc described by the pendulum needle, means to rotate the support about its pivot axis, a scale carried by the frame, and a pointer rigidly connected to said support and movable about the pivot axis of the support during rotation of the support and arranged to move across the scale to indicate the angle of rotation of the support about its pivot.

8. In a testing apparatus, a supporting frame having spaced arms, a pendulum pivotally supported between the frame arms and having a head, a needle carried by said head and extending axially of the pendulum, a material support pivotally arranged between the frame arms on an axis spaced below the axis of the pendulum pivot and in a vertical plane therewith, said support being normally disposed in a plane tangent to the arc described by the pendulum needle, means to rotate the support about its pivot axis, a scale carried by the frame, a pointer rigidly connected to said support and movable about the pivot axis of the support during rotation of the support and arranged to move across the scale to indicate the angle of rotation of the support about its pivot, and means to visually indicate the extent of the swing of the pendulum.

9. In a testing apparatus, a supporting frame having spaced arms, a pendulum pivotally supported between the frame arms and having a head, a needle carried by said head and extending axially of the pendulum, a material support pivotally arranged between the frame arms on an axis spaced below the axis of the pendulum pivot and in a vertical plane therewith, said support being normally disposed in a plane tangent to the arc described by the pendulum needle, means to rotate the support about its pivot axis, a scale carried by the frame, a pointer rigidly connected to said support and movable about the pivot axis of the support during rotation of the support and arranged to move across the scale to indicate the angle of rotation of the support about its pivot, and means to limit rotation of the support about its axis.

10. In a testing apparatus, a supporting frame having spaced arms, a pendulum pivotally supported between the frame arms and having a head, a needle carried by said head and extending axially of the pendulum, a material support pivotally arranged between the frame arms on an axis spaced below the axis of the pendulum pivot and in a vertical plane therewith, said support being normally disposed in a plane tangent to the arc described by the pendulum needle, means to rotate the support about its pivot axis, a scale carried by the frame, a pointer rigidly connected to said support and movable about the pivot axis of the support during rotation of the support and arranged to move across the scale to indicate the angle of rotation of the support about its pivot, said support having a longitudinal channel in its upper surface disposed in the plane of the arc described by the needle, and means to removably secure a specimen of material to be tested to the support in a position overlying the channel therein.

11. In a testing apparatus, a supporting frame having spaced arms, a pendulum pivotally supported between the frame arms and having a head, a needle carried by said head and extending axially of the pendulum, a material support pivotally arranged between the frame arms on an axis spaced below the axis of the pendulum pivot and in a vertical plane therewith, said support being normally disposed in a plane tangent to the arc described by the pendulum needle, means to rotate the support about its pivot axis, a scale carried by the frame, a pointer rigidly connected to said support and movable about the pivot axis of the support during rotation of the support and arranged to move across the scale to indicate the angle of rotation of the support about its pivot, said support having a longitudinal channel in its upper surface disposed in the plane of the arc described by the needle, means to removably secure a specimen of material to be tested to the support in a position overlying the channel therein, and means to apply tension to said material specimen.

12. In a material testing apparatus, a supporting frame, a pendulum pivotally supported by said frame and having a head, a needle carried by the head of the pendulum, a material support carried by said frame below the pendulum pivot and in a plane tangent to the arc of the pendulum needle, means to incline said support about an axis disposed in a vertical plane with the axis of the pendulum pivot, said support having a longitudinal channel in its upper surface disposed in the plane of the arc described by the needle, and means to removably secure a specimen of material to be tested to the support in a position overlying the channel therein.

13. In a material testing apparatus, a supporting frame, a pendulum pivotally supported by said frame and having a head, a needle carried by the head of the pendulum, a material support carried by said frame below the pendulum pivot and in a plane tangent to the arc of the pendulum needle, means to incline said support about an axis disposed in a vertical plane with the axis of the pendulum pivot, said support having a longitudinal channel in its upper surface disposed in the plane of the arc described by the needle, means to removably secure a specimen of material to be tested to the support in a position overlying the channel therein, and means to apply tension to said material specimen.

14. In a material testing apparatus, a supporting frame, a pendulum pivotally supported by said frame and having a head, a needle carried by the head of the pendulum, a material support carried by said frame below the pendulum pivot and in a plane tangent to the arc of the pendulum needle, and means to incline said support with respect to the frame and about an axis disposed parallel to and in a vertical plane with the axis of the pendulum pivot, said axis of inclination being substantially coincident with a portion of the material engaging surface of the support, means to indicate the extent of the inclination of the support with respect to the frame, releasable mechanism to secure the pendulum in its poised position, and releasable means to secure the pendulum in the maximum position of its swing.

15. In a material testing apparatus, a supporting frame, a pendulum pivotally supported by said frame and having a head, a needle carried by the head of the pendulum, a material support carried by said frame below the pendulum pivot and in a plane tangent to the arc of the pendulum needle, means to incline said support with respect to the frame and about an axis disposed parallel to and in a vertical plane with the axis of the pendulum pivot, said axis of inclination being substantially coincident with a portion of the material engaging surface of the support, means to indicate the extent of the inclination of the support with respect to the frame, releasable mechanism to secure the pendulum in its poised position, releasable means to secure the pendulum in the maximum position of its swing, and means to visually indicate such maximum position of the pendulum after the last-named releasable means is operated to release the pendulum.

16. In a testing apparatus, a supporting frame having spaced arms, a pendulum pivotally supported between the frame arms and having a head, a needle carried by said head and extending axially of the pendulum, a material support pivotally arranged between the frame arms on an axis spaced below the axis of the pendulum pivot and in a plane tangent to the arc described by the pendulum needle, means to rotate the support about its pivot axis, a scale carried by the frame, a pointer rigidly connected to said support and movable about the pivot axis of the support during rotation of the support and arranged to move across the scale to indicate the angle of rotation of the support about its pivot, releasable mechanism to secure the pendulum in its poised position, releasable means to secure the pendulum in the maximum position of its swing, and means to visually indicate such maximum position of the pendulum after the last-named releasable means has been operated to release the pendulum.

17. In a testing apparatus, a supporting frame having spaced arms, a pendulum pivotally supported between the frame arms and having a head, a needle carried by said head and extending axially of the pendulum, a material support pivotally arranged between the frame arms on an axis spaced below the axis of the pendulum pivot and in a vertical plane therewith, said support being normally disposed in a plane tangent to the arc described by the pendulum needle, means to rotate the support about its pivot axis, a scale carried by the frame, a pointer rigidly connected to said support and movable about the pivot axis of the support during rotation of the support and arranged to move across the scale to indicate the angle of rotation of the support about its pivot, and means to adjust the needle axially of the pendulum.

References Cited in the file of this patent

UNITED STATES PATENTS

| | | |
|---|---|---|
| 1,329,192 | McAdam, Jr. | Jan. 27, 1920 |
| 1,836,621 | Schubert | Dec. 15, 1931 |
| 2,182,235 | Polushkin | Dec. 5, 1939 |

FOREIGN PATENTS

| | | |
|---|---|---|
| 448,766 | Germany | Aug. 27, 1927 |